United States Patent [19]
Longginou et al.

[11] Patent Number: 5,841,971
[45] Date of Patent: Nov. 24, 1998

[54] INFORMATION TRANSMISSION SYSTEM FOR TRANSMITTING VIDEO SIGNALS OVER CELLULAR TELEPHONE NETWORKS

[75] Inventors: Lucas Longginou, Hamilton; Anthony Maeder, Greenbank, both of Australia

[73] Assignee: Voxson International Pty. Limited, Pinkenba, Australia

[21] Appl. No.: 481,434

[22] PCT Filed: Dec. 17, 1993

[86] PCT No.: PCT/AU93/00673

§ 371 Date: Oct. 31, 1995

§ 102(e) Date: Oct. 31, 1995

[87] PCT Pub. No.: WO94/14273

PCT Pub. Date: Jun. 23, 1994

[30] Foreign Application Priority Data

| Dec. 17, 1992 | [AU] | Australia | PL6436 |
| Feb. 1, 1993 | [AU] | Australia | PL7034 |
| Apr. 8, 1993 | [AU] | Australia | PL8251 |
| May 6, 1993 | [AU] | Australia | PL8684 |

[51] Int. Cl.⁶ .................................................. G06F 13/00
[52] U.S. Cl. ....................................................... 395/200.3
[58] Field of Search ...................... 364/DIG. 1 MS File, 364/DIG. 2 MS File; 370/125, 10; 379/59, 60, 67, 93, 219, 242; 395/200.01, 806, 200.51, 327, 500, 807, 821, 200.3; 348/390, 7

[56] References Cited

U.S. PATENT DOCUMENTS

| 4,704,716 | 11/1987 | Bowers et al. ............................ 370/58 |
| 5,130,792 | 7/1992 | Tindell et al. ............................... 348/7 |
| 5,260,989 | 11/1993 | Jenness et al. ............................. 375/59 |
| 5,345,599 | 9/1994 | Paulraj et al. ........................... 455/49.1 |
| 5,611,038 | 3/1997 | Shaw et al. .......................... 395/200.51 |

FOREIGN PATENT DOCUMENTS

| 3483584 | 5/1985 | Australia . |
| 5693790 | 12/1990 | Australia . |
| 0104456 | 4/1984 | European Pat. Off. . |
| 0425145 | 5/1991 | European Pat. Off. . |
| 89/12370 | 12/1989 | WIPO . |
| 92/12599 | 7/1992 | WIPO . |
| 92/21211 | 11/1992 | WIPO . |

*Primary Examiner*—Robert B. Harrell
*Attorney, Agent, or Firm*—Abelman, Frayne & Schwab

[57] ABSTRACT

An information delivery system comprises equipment located at a first or storage location (10) and additional equipment located at a second or utilization location (11). The locations are interconnected for transmission of information therebetween by a communication medium (12). The system includes elements and methods for increasing the effective rate of transfer of information across information medium 12. These elements and methods include data compression including iterative data compression. The elements and methods further include the synchronised superposition of channels forming communication medium (12). Communication medium (12) can include a cellular mobile telephone network to permit transmission of information between mobile stations (311, 312) and to cellular receivers (217).

30 Claims, 7 Drawing Sheets

INFORMATION TRANSMISSION SYSTEM FOR TRANSMITTING VIDEO SIGNALS OVER CELLULAR TELEPHONE NETWORKS

FIELD OF THE INVENTION

The present invention relates to improvements in information transmission systems and, more particularly, to such systems where it is desired to transmit relatively wide bandwidth data such as compressed or real time video data.

BACKGROUND ART

Electronic storage technology has reached the stage where large volumes of information can be stored relatively cheaply and accessed from storage relatively quickly.

There remain, however, problems in transmitting the large volumes of information over communication channels or networks sufficiently quickly and sufficiently conveniently to be readily usable by the consumer.

It is an object of the present invention to address or substantially ameliorate this problem.

DISCLOSURE OF THE INVENTION

Accordingly in one broad form of the invention there is provided an information delivery system for transmission of information from a first location to a second location, said system including first information processing means at said second location, and a communication channel adapted to transmit said information between said first location and said second location.

The information may be stored in digital form or in analog form at the first location.

The information may be transmitted over the communications channel in digital form or in analog form.

Preferably, the first location comprises a storage location and includes a storage bank in which said information is stored and the second location comprises a utilization location and includes information output, display, presentation or playback means. The second location may also include a storage bank.

The communication channel may be implemented as a wide bandwidth data path by the establishment of a plurality of individual channels of predetermined bandwidth acting together to connect said first location to said second location whereby a bandwidth greater than the bandwidth of any one of said individual channels is available for transmission of said information.

The communication channel may comprise an apparent wide band channel by compression of said information prior to transmission over said channel.

The information is preferably transmitted over said communications channel in real time. The information may also be transmitted in compressed form in less than real time.

The first information processing means may include information storage means and information compression means and the data may be passed from said information storage means to said information compression means for compression of said data prior to return to said storage means. Preferably, the information is iteratively compressed by repeated, adaptive and selective invocation of said compression means.

The second information processing means may include information decompression means and data storage means. Preferably, such decompression means decompresses information prior to storage of said information in said storage means. The information may be iteratively decompressed by repeated adaptive and selective invocation of said decompression means, potentially involving repeated passage between said decompression means and said storage means.

The communication channel may include at least part of a PSTN, ISDN, cellular telephone network, cable, satellite, microwave or optical fibre.

Preferably, the second information processing means includes audio, text, graphical or video presentation, playback, output and display means whereby information comprising such data transmitted over said communication channel can be provided to a suer at said second location.

The display means may comprise a personal computer system, a television receiver, a video phone terminal or a hand-held mobile phone incorporating a video data display. Such a mobile phone may comprise a relatively high electromagnetic radiation emitting portion and a relatively low electromagnetic radiation emitting portion, the low radiation emitting portion being adapted for placement at or near the head of a user and in communication with the high electromagnetic radiation emitting portion; the high electromagnetic radiation emitting portion being adapted for location elsewhere on a user and being further adapted for communication with a cellular telephone network.

The present invention also relates to video compression techniques and, more particularly, to an advantageous usage of such techniques where a large volume of video data is to be transferred.

Accordingly, in a further broad form of the invention, there is provided a system for transmission of video information from a storage location to a utilisation location; said system including a storage bank at said storage location wherein said video information is stored in digital form; said system further including video information playback means at said utilisation location; said system also including transmission means whereby said video information is transmitted from said storage location to said utilisation location on demand.

A further storage bank may be located at said utilization location.

Preferably, the transmission means communicates said video information over a communications medium comprising either the public switched telephone network or unused or spare television channel band width.

According to another aspect of the invention there is provided an information delivery system comprising wide area signal delivery means delivering a signal containing information to a plurality of local receiver means distributed throughout a wide area; each said local receiver means communicating said signal to respective local signal processing means whereby said signal is processed for transmission to a local cellular telephone network for reception by cellular receivers.

The information may be compressed by said local receiver means prior to transmission over the local cellular telephone network and the information is decompressed by each cellular receiver.

The information may be passed as wide band width information over more than one channel of said local cellular telephone network in a synchronized manner to a designated one of said cellular receivers.

The present invention also relates to communication of relatively wide-bandwidth information over cellular telephone networks and the like and, more particularly, to transmission of video information over such networks. Accordingly, there is provided a method for the establishment of a wide-bandwidth data path on a cellular telephone network.

The wide-bandwidth data path may be wide enough for real time video information for the purposes of establishment of a video phone connection between subscribers on said cellular telephone network.

The said data path may comprise a plurality of individual channels with portions of the bandwidth of the wide-bandwidth data signal being distributed across said plurality of individual channels.

In a further broad form of the invention there is provided a wide-bandwidth data path on a cellular telephone network comprising the establishment of a plurality of individual channels of predetermined bandwidth acting together to connect subscribers together whereby a wide-bandwidth data connection is established between subscribers having a bandwidth greater than the bandwidth of any one of said individual channels.

The invention further relates to a modular cellular telephone and, more particularly, to such a telephone adapted to minimise the level of radiation emanating from the telephone near the head of a user.

Accordingly, in a further broad form of the invention, there is provided a mobile telephone communication device comprising a high radiated power portion and a low radiated power portion; wherein the low radiated power portion is physically separate from said high radiated power portion; said high radiated power portion in wireless communication with base stations of a mobile telephone network to which said mobile telephone communication device is adapted to connect; said high radiated power portion at a predetermined low radiated power and said low radiated power portion correspondingly in communication with said high radiated power portion also at said low radiated power.

BRIEF DESCRIPTION OF THE DRAWINGS

In order that the invention may be more readily understood and put into practical effect, reference will now be made to the accompanying drawings in which.

MODES FOR CARRYING OUT THE INVENTION

Figure 1:
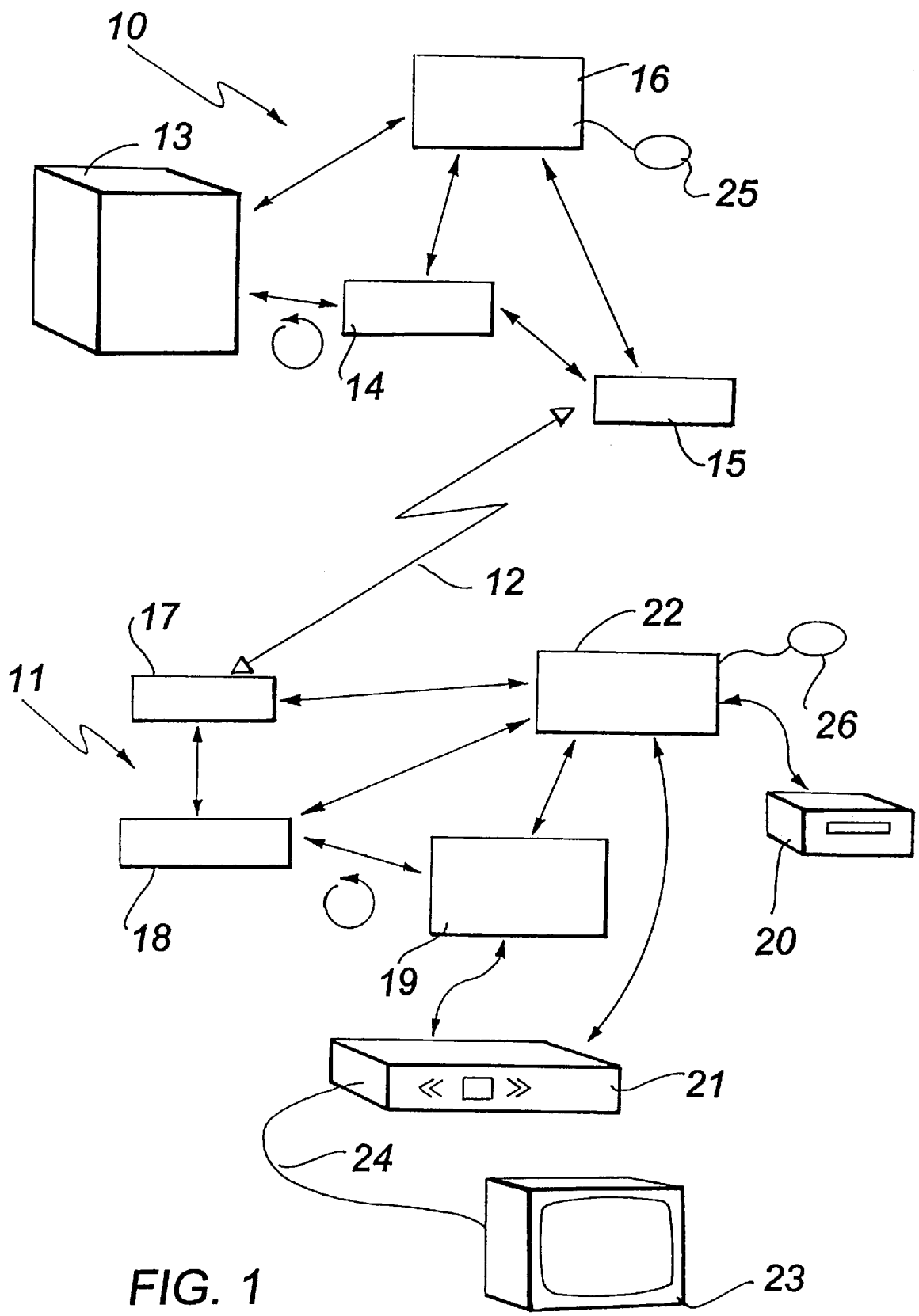
FIG. 1 is a block diagram of an information transmission system for a video movie on demand service according to a first embodiment of the present invention.

The information transmission system illustrated in FIG. 1, includes equipment located at a storage or first location 10 and additional equipment located at a utilisation or second location 11. Communication of information takes place across a communication medium 12 between the two locations.

The equipment at the storage location 10 primarily comprises first information processing means comprising a storage bank 13, compression device 14 and transmitter/receiver 15 all controlled by system controller 16.

In this instance, the storage bank stores video movies in their entirety or in partly or fully compressed digital form. When a particular movie is selected, the digital information comprising that movie is passed to compressor 14 if compression is necessary and then transmitted by transmitter receiver 15 over medium 12 to the equipment at utilisation location 11.

The equipment at the second or utilisation location 11 comprises second information processing means comprising a corresponding receiver/transmitter 17, a decompression device 16, local digital storage 19, credit card reader (or user authentication device) 20 and video replay controller/modulator 21. These devices are controlled by system controller 22 in a manner whereby a selected video movie can be received from digital storage bank 13, stored locally on local digital storage 19 and played back onto T.V./display 23 via the video replay controller/RF modulator 21.

The digital storage bank 13 can comprise a high capacity storage medium such as a WORM drive or CD ROM system having the capacity to store information equivalent to many video movies. The compressor 14 can comprise a digital processor specifically adapted to compress digital information prior to transmission and the decompressor 18 can decompress prior to display. The transmitter/receivers 15, 17 can incorporate modems where the public switched telephone network is to be used as the channel 12. Equivalent modulation/demodulation arrangements can be used where the transmission medium 12 comprises the unused or spare band width of a T.V. channel.

System controls 16, 22 can comprise microprocessor based control devices adapted to orchestrate information transmission between the various components at the storage location and at the utilisation location. Local storage 19 can comprise a high capacity magnetic disc drive whilst video replay controller and RF modulator 21 can comprise a modified video player adapted to receive video image input from local store 19 instead of from the read head of a cartridge based video player.

Credit card reader 20 can comprise any one of the commercially available readers available on the market and for example, used as EFTPOS terminals.

In use, a consumer located at utilisation location 11 initiates a browse and select operation via system control 22. System control 22 communicates over communication medium 12 to provide the appropriate summary information from digital storage bank 13. To make a selection and initiate a send operation, the consumer must provide the appropriate payment by entry of an appropriate credit or debit card into card reader 20.

Once successful payment has been signalled, the selected movie is passed in digital form from storage bank 13 via compressor 14 over communication medium 12 to local store 19 where it can be accessed by the consumer using the video player controls on video player 21. The controls would include those of the type typically found on a cartridge tape video player.

The storage system control 16 is capable of the following functions:

(a) accept and process user commands and provide messages in response;

(b) accept and process supervisor interactions, including addition of functions;

(c) maintain billing, accounting, usage, inventory and access authority (security) information to support operation of the system and use by utilization sites;

(d) control of and transfer of data between 13, 14, 15;

(e) recovery from incorrect commands, errors and catastrophic events (e.g. power cut);

(f) management of compression activities and data formats;

(g) management of data storage layout, indexing and retrieval;

(h) interface to other possible associated systems for data and control interaction (e.g. computers, peripherals (e.g. printers), intelligent image or video generation devices, receiver stations).

The utilization system control 22 is capable of the following functions:

(a) accept and process user commands and provide message in response;

(b) provide billing, accounting, usage information on demand;

(c) allow user access to inventory and billing information from storage site;

(d) control of and transfer data between 17, 18, 19 and 21; accept user payment and access authority input from 20;

(e) recovery from incorrect commands, errors and catastrophic events;

(f) management of decompression activities for local format/formats;

(g) management of local data storage and retrieval;

(h) interface to other possible associated devices for data and control interaction;

(i) interaction facilities for other systems sharing use of transmission link 12;

(j) operation of appropriate components of utilization system in the absence of transmission link 12 (i.e. 18, 19, 21 to permit e.g. tape to local store transfers).

The video compression technique can cater for varying user needs such as different bandwidths for transmission link 12, different display characteristics and quality at TV/display 23, different storage modes or capacity at local store 19 or storage bank/data source 13 for different applications.

The video compression technique comprises several separate compression methods of which one will be selected prior to use, or several adaptively mixed during use. The methods described below could be selectively used and a record maintained of the selections made, to be transmitted to the decompressor along with the compressed data so that the same selections can be reproduced during decompression.

Some such selections may be deducted by the decoder if explicit conditions for selection switching are incorporated in the decompression algorithm which are identical to the decision criteria used by the compression algorithm (i.e. are based only on data already processed by the algorithm, not any future unseen data).

Various compression methods can be utilized including scene structure analysis, subsampling/quantization, compression standards and information theoretic coding.

In the context of this description, "pixel" means a single displayable sample (i.e. point) of digital image information, "frame" means a single complete digital image in the video sequence, "scene" means a succession of adjacent frames containing closely related data, "region" means a set of adjacent pixels within a frame that contain closely related information, "boundary" means the set of adjacent pixels that are each adjacent to other pixels in two or more regions, "block" means an adjacent rectangular group of pixels, "line" means a block of single pixel width, "texture" means the pattern relationships existing between groups of adjacent pixels, in either regular or irregular pattern form, and "neighbourhood" means a set of adjacent pixels relative to a specific single pixel.

With scene structure analysis, the successive frames of the video sequence will be analysed in digital form using a computer algorithm, to identify:

(i) scene charges, on the basis of more than a prescribed error tolerance between pixel values in adjacent frames;

(ii) movements and changes affecting size, position, orientation, detail (sharpness), clarity, colour/intensity, texture and boundary shape of regions over pairs and sets of adjacent frames (including motion compensation and optical flow);

(iii) mutual interaction of regions including overlap, transparency, warping, overlay.

Identification of regions will be undertaken by intensity/colour and texture segmentation methods.

With subsampling/quantization, reduction in amount of pixel information per region or per frame will be undertaken by all or some of:

(i) Spatial resolution reduction by subsampling or resampling of groups of pixels in blocks, lines, boundaries, regions using a regular (similar) or varying (irregular) size of input and output samples and sets of sample values, at regular or irregular positions from region to region, from frame to frame or from scene to scene, or within half-frame alternate scow interlace.

(ii) Visual quality reduction by subsampling or resampling of colour/intensity and texture, definition of representative subsets of these, models for regional changes and importance of these to replace the specification of values pixel by pixel, and increasing visual effects associated with fast movement (such as motion blur), regular/repeated motion (cycles of movement and kinephantom) and existence of multiple regions having different contributions to visual) understanding of the scene (e.g. focus blur, random noise, relative intensity/colour as perceived rather than as explicitly measured and represented).

(iii) Temporal resolution by subsampling or resampling frames in a sequence to provide description of changes pixel by pixel, region by region and frame by frame over a separation of several frames in time, and by quantizing types and amounts of changes which can be represented as described in (a)ii).

(iv) Frequency resolution obtained by transforming arbitrary groups of pixels, including blocks, regions, frames and scenes, to alternative representation providing frequency descriptions for the group, such as Fourier and related transforms, wavelet decomposition, sub-band coding or signatures to permit selective frequency bandwidth in the data. The quantization techniques to be employed include table lookup, vector quantization, probability clustering, decimation, iterative improvement and selection.

In the case of compression standards, the formats established by existing ISO and CCITT standards would be used (to allow ease of implementation, use of hardware implementation and compatibility with different decompressors). These formats might include:

(i) JPEG
(ii) MPEG, MPEG-2 and MPEG-4
(iii) H.261
(iv) FAX GROUP 3 and 4
(v) JBIG With information theoretic coding, the use of methods in conjunction with above techniques which will achieve optimally compact representation of compressed data streams or preprocessed data to produce compressed data streams including:

(i) Entropy (probability) coding;
(ii) Codebook of dictionary construction;
(iii) Difference coding (residuals or errors);
(iv) Predictive coding;
(v) Context or neighbourhood based coding.

In addition to the above methods, the information describing which selection has been made and any variable parameters associated with that selection, might need to be specified for transmission to the decoder. This would be implemented by defining a set of symbols to represent each different selection and inserting them prior to the compressed data stream, or in a separate sequence from the compressed data stream. These symbols may be subject to further compression by the methods immediately above.

The decoder will reconstruct pixels, regions, frames and scenes by first decoding the compressed data stream and selection symbols to provide an initial reconstructed version of a frame, then interpolating or estimating missing or approximated data values to achieve the full resolution required for replay or display, including systematic or random dithering, blurring, sharpening or resampling to hide visual artifacts.

Although the invention according to a first embodiment has been described somewhat specifically in relation to the delivery of video information from a conceptual storage location to a conceptual utilization location it is intended that the behaviour of the entire system described thus far should be viewed broadly functionally.

So, for example, transmission medium 12 can be realised using analog or digital techniques and could form part of a public, private or corporate network. For example transmission media 12 could be realised by any one of the following means:

twisted pair or other PSTN medium, including ISDN/B-ISDN lines, ADSL;
Optical fibre or other Telecom data service infrastructure lines;
Trunked radio;
Single or multiple channel cellular network;
Microwave links;
Satellite links;
Excess channel space on TV broadcast spectrum In certain implementations the transmission medium 12 can support bidirectional communications. Perhaps the most ambitious use of bidirectional capability is where the system of FIG. 1 is mirror imaged and superposed upon itself so that at each location there is both storage and utilization capability. This aspect is described further in later embodiments below in the context of personal communications devices communicating over the mobile telephone network and the like.

In less ambitious forms bidirectionality of transmission medium 12 is required merely for exchange of commands, confirmations, data and video where necessary and appropriate.

Storage bank 13 can be implemented using either digital or analog means. Analog forms of storage can include video disc and video tape. Also included is the situation where information is produced in real time for passage from storage bank 13 to transmission medium 12 eg. relying on information produced by third parties. Composite or juke box arrangements are also envisaged where information passed to transmission medium 12 is derived from more than one such source in accordance with the requirements of a user at the utilisation location 11.

Data stored in storage bank 13 can be compressed in full or in part. Furthermore interactive compression procedure can be followed whereby data is passed from storage bank 13 to compression device 14 for return in compressed form to storage bank 13. The thus compressed data may again be passed to compression device 14 for further compression and return to storage bank 13. Similar activity may occur during decompression with 18 and 19. Furthermore the form in which the data is represented or stored may vary during each iteration eg. broadcast-compress-digital; analog-compress-digital.

In particular forms of the invention the degree of compression, the nature of compression, the number of iterations of compression and the manner of storage of compressed data will be determined in conjunction with the specific nature of the transmission medium 12 to go with the nature of the requirements of a user at a utilization location 11. Transmission medium 12 can transport the information in a variety of forms ranging from uncompressed, real time video to compressed, real time data to packet or switched data to bidirectional controlled flow of data. As stated in respect of compression techniques, the choice of the nature of transmission of the information on transmission medium 12 is also dependent on the nature of the transmission medium 12 (particularly, but not exclusively, its bandwidth and whether it is bidirectional or not) and also upon the expectations and requirements of a user at a utilization location 11.

Accordingly the system provides a degree of flexibility whereby different combinations of compression procedure and transmission medium can be selected to satisfy different performance/control requirements and timing characteristics for different applications. In the specific application described with reference to FIG. 1 it is a specific requirement that video information be transported over transmission medium 12 in less time than is required to display or replay that information at normal video rates at the utilization location 11.

Selectivity in relation to decompression is also possible at utilization location 11. For example decompression device 18 may only partially decompress data arriving over transmission medium 12 whereby local store 19 can contain fully decompressed, partly decompressed and uncompressed data.

Furthermore, an iterative decompression procedure may be undertaken whereby compressed data or partly decompressed data is removed from local store 19 for subsequent decompression by decompression device 18. This procedure can occur in either real time or slower than real time.

Particularly where iterative decompression is to be utilized local store 19 is adapted to store more than one data entity whereby, whilst one data entity is being processed by replay controller 21 another data entity can be undergoing interative decompression. Furthermore video replay controller 21 can undertake limited final decompression of data in real time during replay.

Replay controller 21 may incorporate other means of capturing, copying or storing video information (eg. video tape, video disc or CD). Link 24 can be a straight RF aerial connection to a standard TV set. In the alterative other connection technologies can be used, particularly where visual display is to be performed by other than TV 23. For example, a display can be output via computer terminal screen, display panel, projection device, video phone, multimedia terminal, teleconferencing station, HDTV device, cellular mobile video telephone and the like. A mobile phone emplementation is discussed specifically later in this specification.

Replay controller 21 can incorporate facilities for user control of the replay process either through local controls or via commands issued through system control 22. Typical controls are in the same manner as for a typical VCR and include fast forward play, fast forward advance, fast reverse play, fast reverse advance, selected frame or playing time positioning, forward or reverse skip, freeze frame, split screen multiple video display, reduced simultaneous multiple frame display, insertion/superposition of multiple video displays or TV broadcasts.

The facilities provided by card reader 20 can be implemented by other means. For example billing information can be input from in-built identification information at the utilization location or can be keyed in by a user on a keypad associated with system control 22. In some applications billing can be omitted—for example where the entire system is owned and operated by the one entity. Where billing and like system usage accounting is required then, at least in some implementations, management/logging information and access and authorisation information will need to be passed in either direction along communication medium 12 whereby system control 16 and system control 22 can orchestrate the availability of system facilities and the accounting for them, if necessary in conjunction with further communication with external networks or data bases.

System controls 16, 22 include a user interface 25, 26 respectively. Where the system control 16 or 22 forms part of a computer system then the computer screen and keyboard of such system can provide the user interface 25, 26. Alternatively other forms of interface such as keypad, touchpad/screen, mouse and LED or LCD display can be utilized.

In order to ensure flexibility in utilization of the system, the system can be capable of handling video data in more than one standard format and also be capable of conversion between the formats eg. between PAL, NTSC, video phone, teleconferencing, multimedia and HDTV format.

To facilitate this the system can define its own internal video data format for internal transmission between components of the system. In this event incoming data in any one of the above specified formats will be converted at the time of first entry into the system into the standard internal format. This conversion can be undertaken within system control 16 implemented in either hardware or software. Alternatively, the conversion process can be attached to storage bank 13 and transmittor/receiver 15.

Although it is envisaged that the data processed and transmitted according to various embodiments of the invention will be data intended for video display, it is to be expected that data destined for other purposes or other forms of output can also be delivered by the system. Typically, however, such other data (for example control data or audio data) will form only a relatively small proportion of the total data to be transmitted per unit time.

Further implementations and examples of the invention will now be described. In the examples to follow the communication medium 12 is implemented, at least in part, by a cellular mobile telephone transmission system. Also in these further examples TV 23 is replaced by video phone-type devices, whether hand held or otherwise. In many of the video phone implementations the video phone can be thought of as a superposition of storage location devices and utilization location devices as referenced with respect to FIG. 1. In these implementations less emphasis is placed on storage and replay capability with the majority of video data being generated in real time at one video phone location for transmission and immediate recept (and "playback") at another video phone subscriber location.

Figure 2:
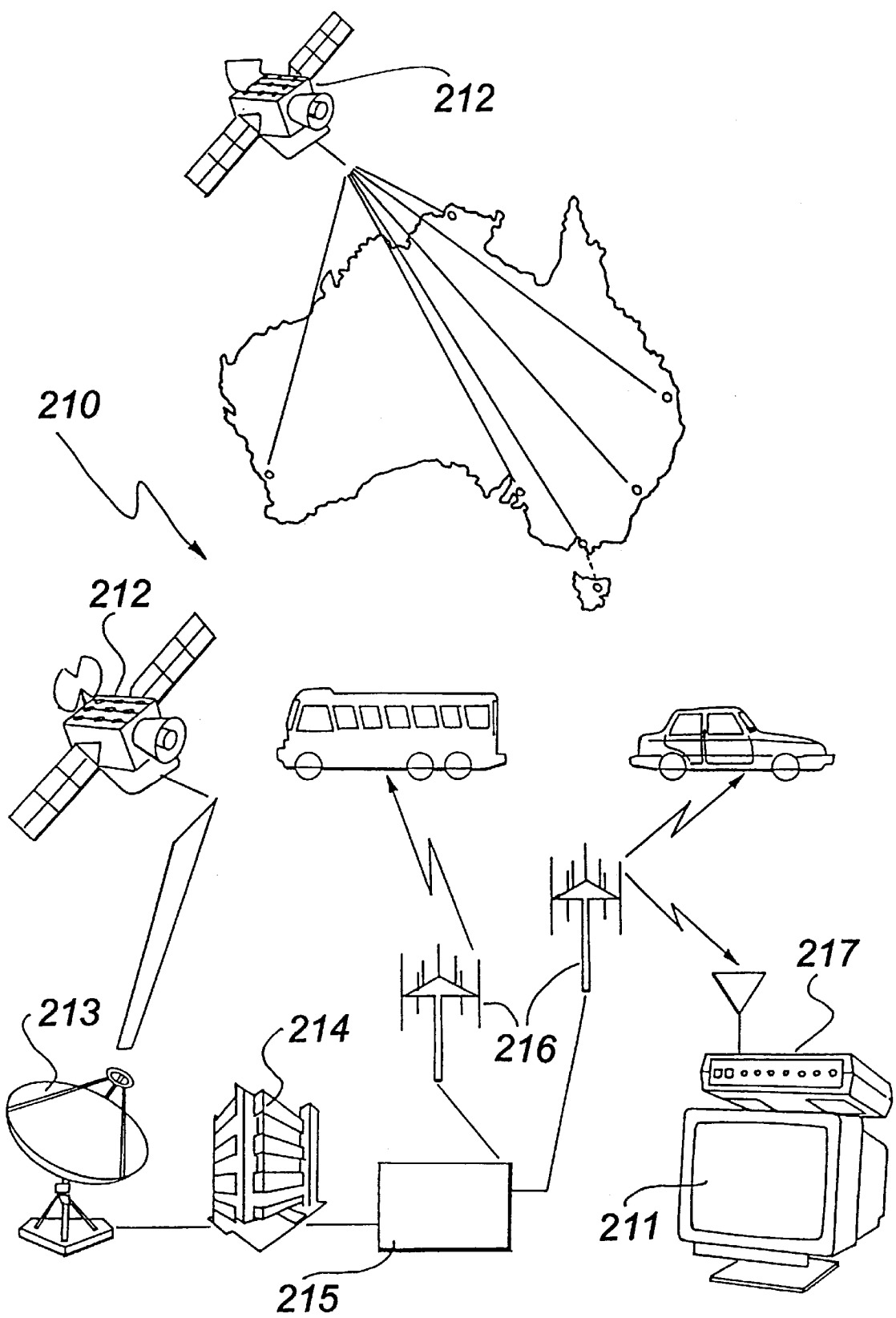
FIG. 2 is a block diagram of a second embodiment of the invention implemented as a pay television delivery system.

FIG. 2 illustrates a system suitable for the delivery of pay television signals which utilises as part of the transmission path both satellites and a cellular telephone network. The satellite alllows for broad coverage of a wide geographical area (for example one country) whilst the cellular telephone network provides localised information delivery combined with control of that information delivery.

In FIG. 2, a wide band width information delivery system 210 is arranged to deliver pay television services to a local subscriber's television set 211.

In this particular arrangement a satellite 212 arranged to cover a broad geographical foot print (such as Australia as shown in the top inset) is fed digital compressed signals by a means not shown. The satellite retransmits the digital compressed signal to a ground based satellite dish 213. Ideally there is one satellite dish 213 for each STD telephone area, or like grouping of user devices.

The satellite dish 213 passes the digital compressed signal to a control and editing room 214 (where the digital compressed signal can be modified as appropriate for the purposes of delivering pay television services). The edited signal then passes from the control room 14 to the public switched telephone network 215 where it is routed to the digital cellular mobile telephone network 216 for reception by designated cellular receivers 217. The digital cellular mobile telephone network can be, for example, of type GSM or CDMA or TDMA. The information broadcast over this network can be in either compressed or decompressed format and over one channel or multiple channels up to 16 channels.

The cellular receiver 217 is adapted to receive the pay television signal transmitted over the digital cellular telephone network 216 and to decode, expand and enhance the information as appropriate.

The resultant data is then converted to RF for direct reception at the antenna input of television set 211.

The cellular receiver 217 includes controls whereby the viewer is able to select a television channel for viewing on television set 211 and be billed for the video information received. In one particular form debiting of a smart card or debit card for the information received can be performed by the cellular receiver 217.

The cellular receiver 217 can be identified by way of its electronic serial numbers in a manner currently used by the standard cellular network for identification. By this arrangement both billing and identification information can be recorded within the cellular receiver 217 and, as appropriate, can be transmitted back to control room 214.

Figure 3:
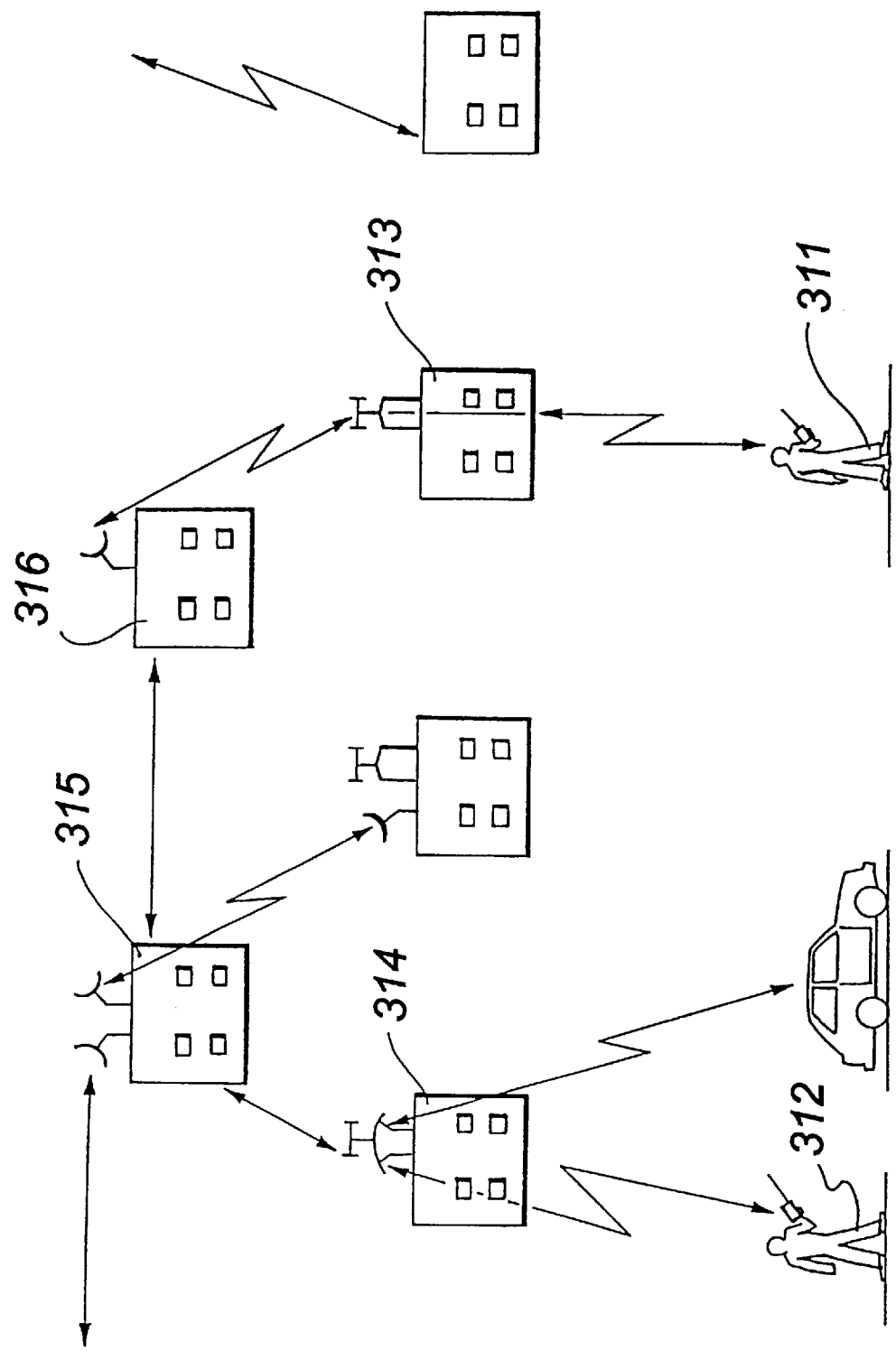
FIG. 3 is a block diagram of a typical arrangement of a mobile telephone system.

FIG. 3 illustrates a typical arrangement of a mobile cellular system (analogue or digital) comprising of a relatively large number of cells within which mobile telephone stations can communicate with each other. The cells are transmitting and receiving sites distributed in a network of locations separated typically by distances of between five kilometres and some hundreds of metres depending on the density of the expected telephone traffic.

It will be seen that a typical telephone connection between a first mobile station 311 and a second mobile station 312 is established via local transmitter/receiver base stations 313, 314 which are in direct communication respectively with first and second mobile stations 311, 312. In turn these base stations 313, 314 are in communication with main stations such as main stations 315, 316 either by landline or by radio/microwave link. These main stations 315, 316 can communicate, in turn, with the (generally land based) public switched network (not shown).

Figure 4:
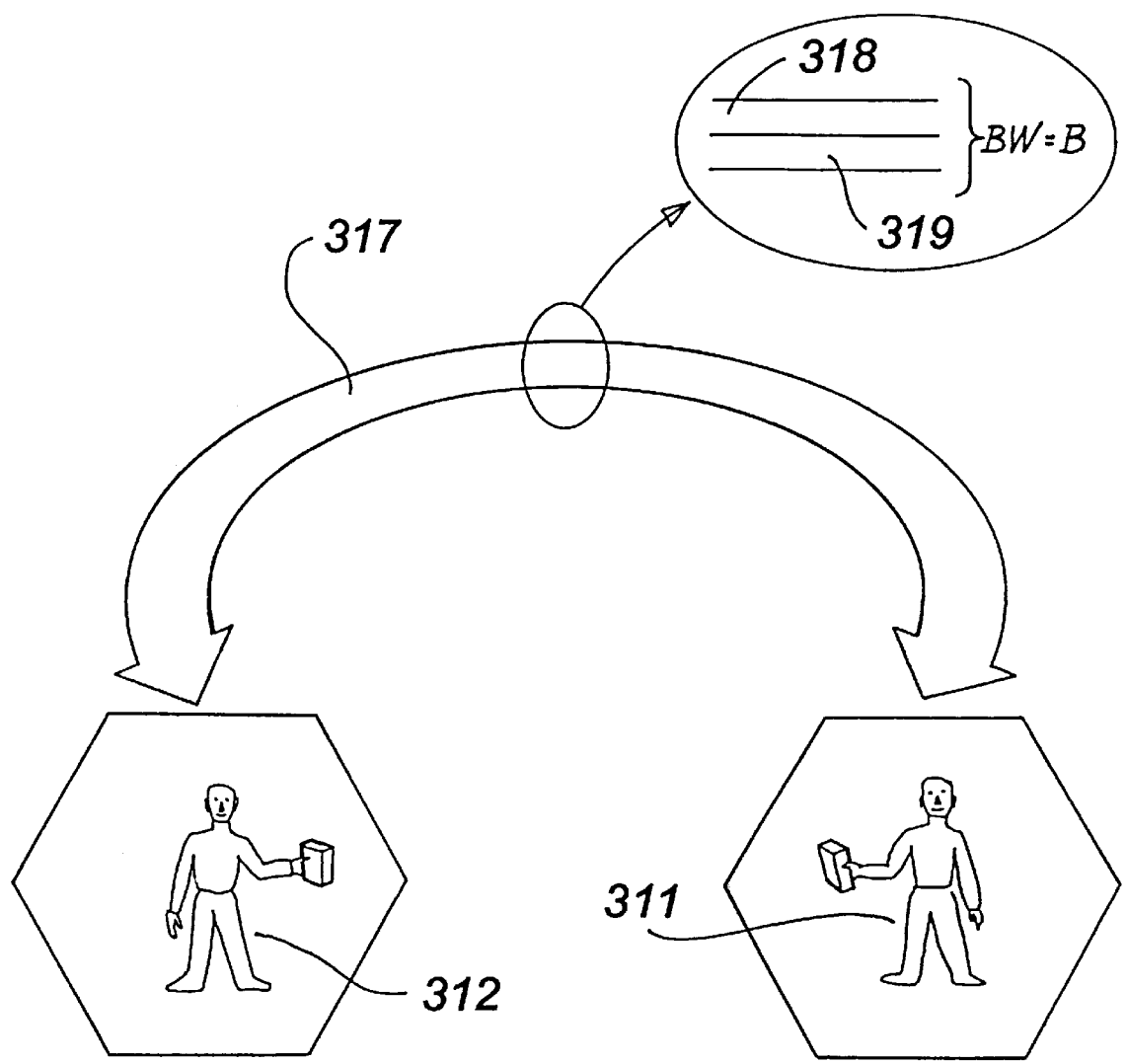
FIG. 4 is a block diagram illustrating a typical data path of an individual channel on a mobile telephone network.

FIG. 4 illustrates the communication path between first mobile station 311 and second mobile station 312. The link or individual channel 317 can be conceptualised as a data path established between the mobile stations 311, 312 of a predetermined bandwidth B.

A small portion of the bandwidth B is reserved as a control layer 318 however the majority of the bandwidth is reserved for user to user communications and is termed the signal layer 319.

Data compression techniques selected and modified from those described previously can be used to optimise/maximise the use of that available bandwidth B.

Figure 5:
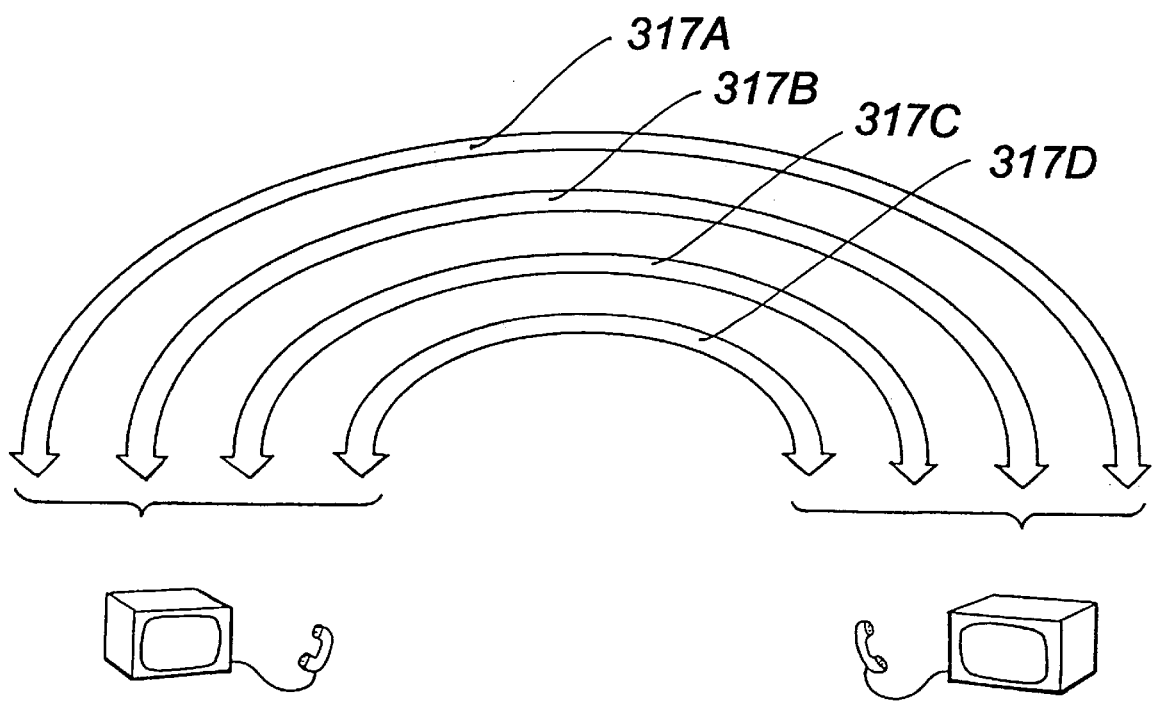
FIG. 5 illustrates a wide-band interconnection across a mobile telephone network according to a particular implementation of the communication medium for the system of either FIG. 1 or FIG. 2.

One particular method of increasing available bandwidth between two mobile stations on a cellular telephone network is illustrated in FIG. 5.

In this arrangement two video telephones 320, 321 are linked for wide-bandwidth data communication by means of four individual channels 317A, 317B, 317C, 317D simultaneously.

With this arrangement the effective bandwidth available for data transmission between the two video telephone 320, 321 is approximately 4 times B.

The simultaneous establishment of, in this case, 4 individual channels 317, interlinked so as to act as a single data path, can be orchestrated through signal layers 319 of the respective individual channels 317A, 317B, 317C, 317D.

Figure 6:
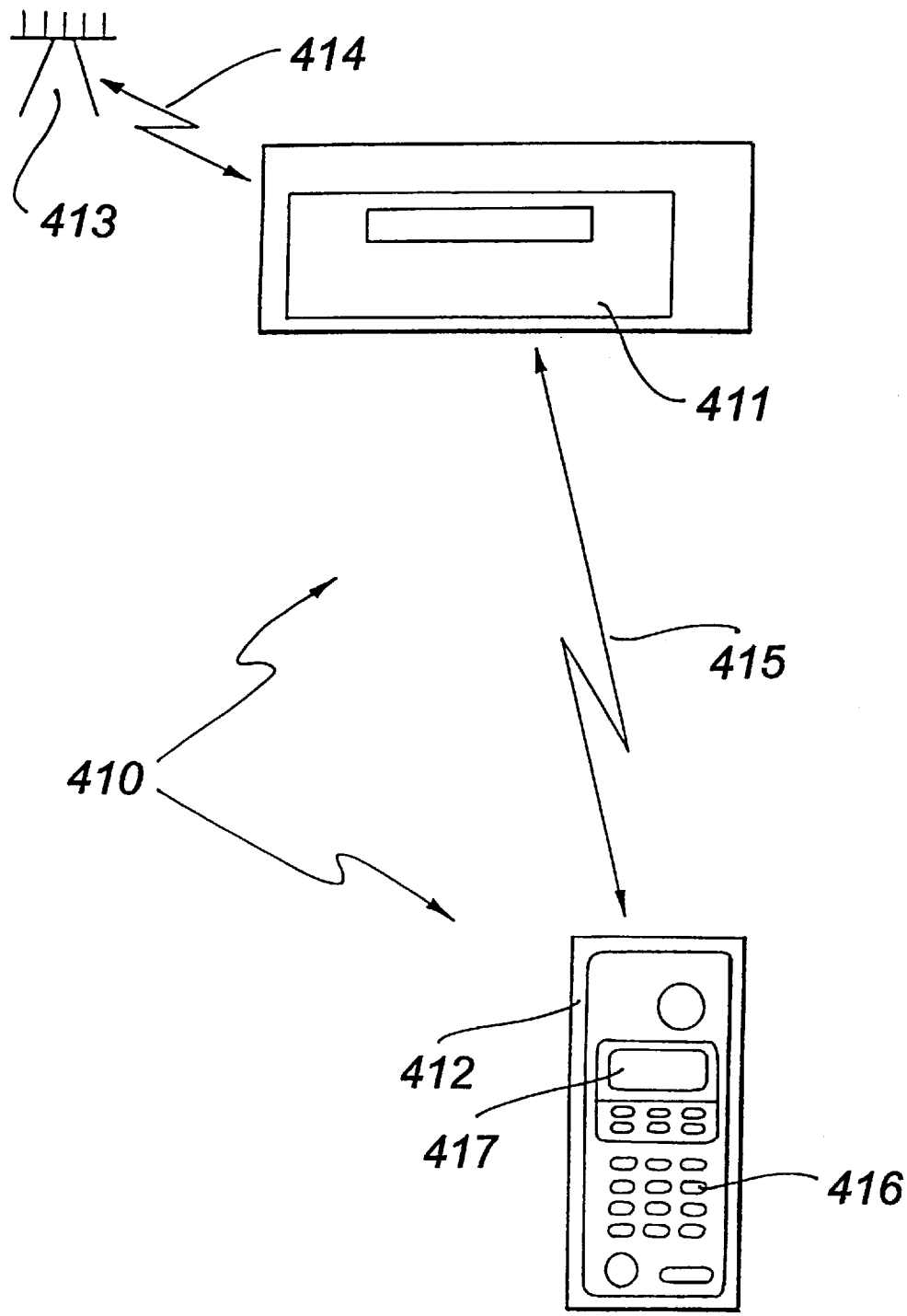
FIG. 6 is a block diagram of a mobile telephone communication device adapted to perform at least some functions of either or both of the storage location equipment or utilization location equipment of FIG. 1.

With reference to FIG. 6 a mobile telephone communication device 410 comprises a high radiated power cellular phone module 411 physically separated and distinct from a low radiated power handpiece module 412.

Phone module 411 incorporates the standard electronics of a mobile telephone including the receiver/transmitter portions adapted for communication with base station 413 by way of a high power signal 414.

Handpiece module 412 also includes a second low power receiver/transmitter adapted for communication with handpiece module 412 via low power signal 415.

Handpiece module 412 includes a corresponding low powered transmitter/receiver adapted for low range cordless communication.

Preferably, the cordless communication between the handpiece module 412 and the phone module 411 can be selected from one of 40 channels in either the 800–900 MHz range or 30–46 MHz range.

The handpiece module includes a standard mobile telephone keypad 416 and digital display 417. The signal radiated by the handpiece module 412 will be in the range of 1 mW–4 milliwatts.

Figure 7:
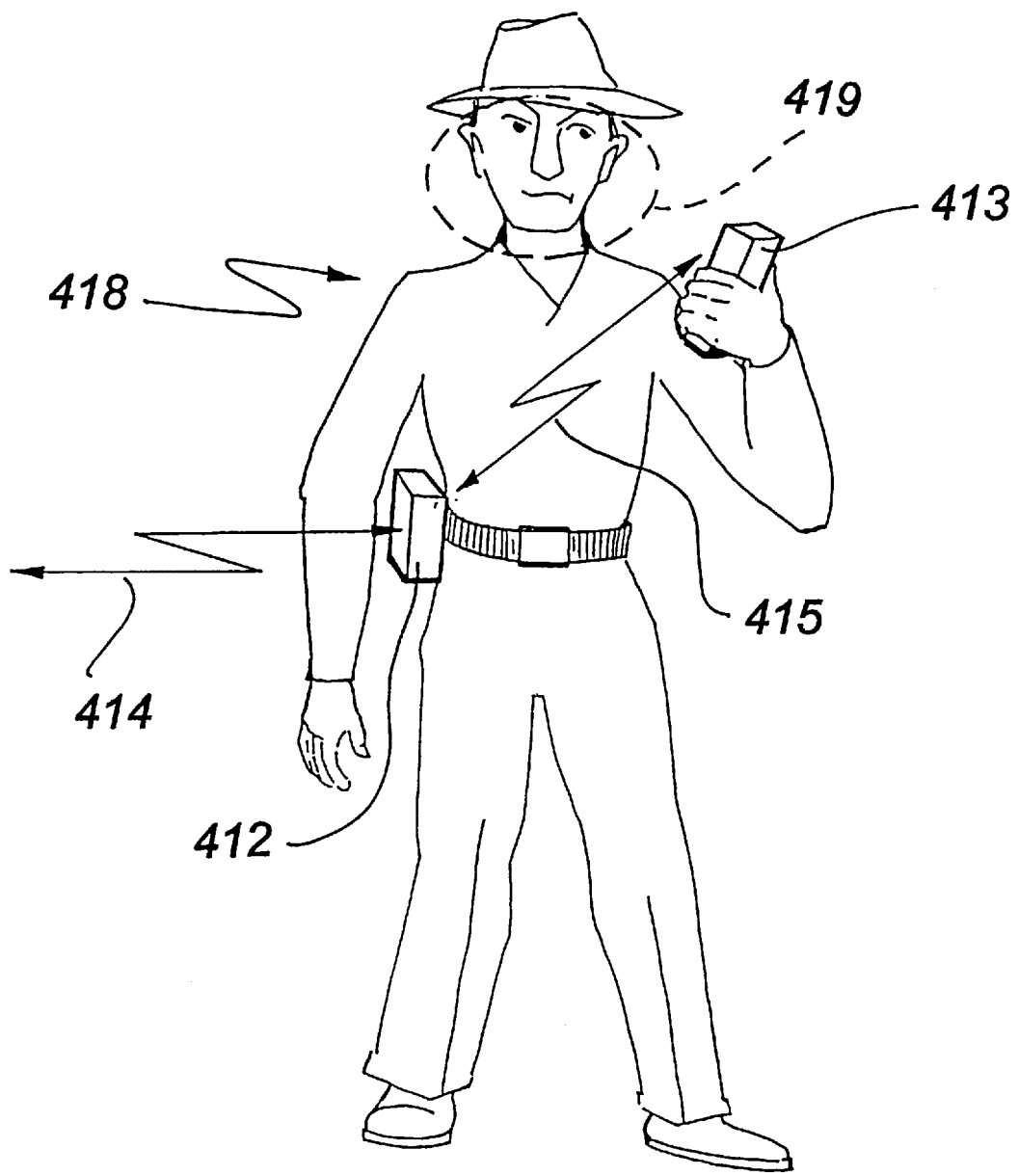
FIG. 7 is a location diagram illustrating a preferred form of use of the mobile telephone communication device of FIG. 6.

In use, as shown in FIG. 7, a user 418 can attach the phone module 411 to a belt or the like whereby the relatively high power transmissions from the phone module 411 to base station 413 are kept away from the head portion 419 of user 418.

Handpiece module 412 being in low power communication with phone module 411 can be used adjacent or against the head portion 419 of user 418 with reduced risk of harmful electromagnetic radiation exposure.

The mobile telephone 410 can operate as a cellular telephone of the analogue type, GSM type, CDMA type, TDMA type or digital type.

The modular arrangement of the mobile telephone 410 allows the incorporation of additional features such as a smart card, paper, diary and calculator into one or other of the phone module 411 or handpiece module 412.

INDUSTRIAL APPLICABILITY

The invention is applicable for communication of information, including particularly video information, over commercially available communication channels whereby relatively wide bandwidth information is available in convenient form to the consumer.

We claim:

1. An information transmission system for transmission of relatively wide-bandwidth information from a first location to a second location in a cellular telephone network, said system comprising:

a receiver/transmitter base station at said first location;

a cellular receiver at said second location;

a communication channel in the cellular telephone network adapted to transmit the information from the first location to the second location upon a request over the communication channel initiated by a user of the cellular telephone network; and wherein the communication channel is implemented as a wide-bandwidth data path by the establishment of a plurality of individual channels of predetermined bandwidth acting together to connect the base station to the cellular receiver, whereby the data path has a bandwidth greater than the predetermined bandwidth of any one of said individual channels.

2. The system of claim 1 wherein the relatively wide-bandwidth information includes video signals.

3. The system of claim 2 wherein the base station includes the first video signal storage means and video signal compression means.

4. The system of claim 3 wherein the video signals are passed from said first video signal storage means to said video signal compression means for compression of said video signals prior to said storage means.

5. The system of claim 4 wherein the video signals are iteratively compressed by repeated, adaptive and selective invocation of said compression means.

6. The system of claim 2 wherein the cellular receiver includes video signal decompression means and video signal storage means.

7. The sytem of claim 6 wherein said decompression means decompresses the video signals prior to storage of said video signals in said storage means.

8. The system of claim 7 wherein the video signals are iteratively decompressed through repeated passage between said decompression means and said storage means.

9. The system of claim 2 wherein said second location includes means for displaying the video signals.

10. The system of claim 9 wherein said display means comprises a television receiver.

11. The system of claim 9 wherein said video display means comprises a video phone terminal.

12. The system if claim 9 wherein said video display means comprises a hand-held mobile phone incorporating a video data display.

13. The system of claim 2 wherein said video signals are transmitted over said communication channel in digital form.

14. The system of claim 2 wherein said first location includes a storage bank in which said video signals are stored.

15. The system of claim 2 wherein said second location includes means for storing the video signals.

16. The system of claim 2 wherein said video signals are transmitted over said communication channel in real time.

17. The system of claim 1 wherein portions of the bandwidth of the relatively wide-bandwidth information are distributed across said plurality of individual channels.

18. The system of claim 1 wherein the predetermined bandwidth of each individual channel includes a control layer and a signal layer, wherein the establishment of said plurality of individual channels is orchestrated through the signal layers of the respective individual channels.

19. An information transmission system for transmission of relatively wide-bandwidth information from a first location to a second location in a cellular telephone network, said system comprising:

a first mobile station including a transmitter portion, at said first location;

a second mobile station including a receiver portion, at said second location;

a communication channel in the cellular telephone network adapted to transmit the information from the first location to the second location upon a request over the communication channel initiated by a user of the cellular telephone network; and wherein the communication channel is implemented as a wide-bandwidth data path by the establishment of a plurality of individual channels of predetermined bandwidth acting together to connect the first mobile station to the second mobile station, whereby the data path has a bandwidth greater than the predetermined bandwidth of any one of said individual channels.

20. The system of claim 19 wherein the relatively wide-bandwidth information includes video signals.

21. The system of claim 20 wherein said second location includes means for displaying the video signals.

22. The system of claim 21 wherein said video display means comprises a hand-held mobile phone incorporating a video data display.

23. The system of claim 22 wherein said mobile phone is comprised of a relatively high electromagnetic radiation emitting portion and a relatively low electromagnetic radiation emitting portion, said low radiation emitting portion being adapted for placement at or near the head of a user and in communication with said high electromagnetic radiation emitting portion, said high electromagnetic radiation emitting portion being adapted for location around the waist of the user and further adapted for communication with the cellular telephone network.

24. The system of claim 20 wherein said video signals are transmitted over said communication channel in digital form.

25. The system of claim 20 wherein said first location includes a storage bank in which said video signals are stored.

26. The system of claim 20 wherein said second location includes means for storing the video signals.

27. The system of claim 20 wherein said video signals are transmitted over said communication channel in real time.

28. The system of claim 19 wherein portions of the bandwidth of the relatively wide-bandwidth information are distributed across said plurality of individual channels.

29. The system of claim 19 wherein the predetermined bandwidth of each individual channel includes a control layer and a signal layer, wherein the establishment of said plurality of individual channels is orchestrated through the signal layers of the respective individual channels.

30. The system of claim 19 wherein the communication channel connecting the first mobile station to the second mobile station is established via local transmitter/receiver base stations which are in direct communication respectively with the first mobile station and the second mobile station.

* * * * *